(12) United States Patent
Buckley et al.

(10) Patent No.: US 6,648,104 B1
(45) Date of Patent: Nov. 18, 2003

(54) WATER COOLED SINGLE PIECE BRAKE CALIPER

(75) Inventors: James A. Buckley, Whitefish Bay, WI (US); Toby Lichtensteiger, West Bend, WI (US)

(73) Assignee: Hayes Brake, LLC, Mequon, WI (US)

( * ) Notice: Subject to any disclaimer, the term of this patent is extended or adjusted under 35 U.S.C. 154(b) by 0 days.

(21) Appl. No.: 10/000,871

(22) Filed: Nov. 2, 2001

(51) Int. Cl.⁷ .............................................. F16D 55/02
(52) U.S. Cl. .................. 188/71.6; 188/264 CC
(58) Field of Search ............... 188/71.5, 71.6, 188/73.1, 264 CC, 264 P, 264 R, 264 D, 155

(56) References Cited

U.S. PATENT DOCUMENTS

| | | |
|---|---|---|
| 2,414,753 A | 1/1947 | Majneri |
| 3,941,219 A | 3/1976 | Myers |
| 4,002,226 A | 1/1977 | Rainbolt et al. |
| 4,014,410 A | 3/1977 | Bryant |
| 4,077,500 A | 3/1978 | Hickman, Sr. et al. |
| 4,245,723 A | 1/1981 | Moriya |
| 4,415,067 A | 11/1983 | Cory |
| 4,815,573 A | 3/1989 | Miyata |
| 4,821,847 A | 4/1989 | Langdon et al. |
| 4,938,321 A | 7/1990 | Kelley et al. |
| 5,125,482 A | 6/1992 | Negishi |
| 5,394,963 A | 3/1995 | Deane et al. |
| 5,445,242 A | 8/1995 | Pogorzelski et al. |
| 5,558,183 A | 9/1996 | Way |
| 5,657,837 A * | 8/1997 | Yamadera et al. ....... 188/73.45 |
| 5,954,166 A | 9/1999 | Maeda |
| 6,321,880 B2 * | 11/2001 | Nakamura ................. 188/71.6 |
| 6,386,333 B1 * | 5/2002 | Russell ....................... 188/71.6 |
| 6,478,126 B2 * | 11/2002 | Drecq ........................ 188/71.6 |

FOREIGN PATENT DOCUMENTS

| | | |
|---|---|---|
| EP | 1 016 804 | 7/2000 |
| GB | 1065267 | 4/1967 |
| GB | 2088503 | 12/1981 |
| GB | 2330388 | 4/1999 |
| JP | 58177609 | 4/1985 |
| JP | 62-278329 | 12/1987 |

* cited by examiner

*Primary Examiner*—Jack Lavinder
*Assistant Examiner*—Melanie Torres
(74) *Attorney, Agent, or Firm*—Boyle Fredrickson Newholm Stein & Gratz S.C.

(57) ABSTRACT

A brake caliper includes a cast metal housing having a bore extending perpendicularly to a disc located adjacent the housing, at least one piston slidably mounted in the bore, and a brake pad mounted on the piston. A coolant passage, formed through the housing in liquid isolation from the bore, coupled to a source of liquid coolant. The coolant passage is a single-pass passage having a coolant inlet and a coolant outlet. The coolant passage is configured to minimize turbulence of coolant flowing therethrough while still promoting effective heat transfer to the flowing coolant from the piston and brake fluid. Preferably, the housing is an aluminum housing formed from a single casting.

25 Claims, 6 Drawing Sheets

WATER COOLED SINGLE PIECE BRAKE CALIPER

BACKGROUND OF THE INVENTION

1. Field of the Invention

The present invention relates to a brake assembly for a vehicle such as a snowmobile and, more particularly, to a liquid cooled brake caliper.

2. Discussion of the Related Art

Caliper disc brakes generally include a caliper housing having a brake pad assembly supported in the housing on each side of a disc brake rotor. Typically, both brake pad assemblies are mounted on movable pistons that can be mechanically or hydraulically driven into engagement with the rotor. Alternatively, one of the brake pad assemblies could be driven into engagement with the rotor, and the other brake pad could be pulled into engagement with the rotor due to the caliper housing movement or due to deflection of the brake disc.

Brake calipers must be capable of withstanding the heat created by the friction of brake pads rubbing against the brake disk. When used in high speed, high torque, and/or high duty cycle applications such as high performance snowmobiles, brake calipers tend to overheat because of the large quantities of energy that must be absorbed by the brakes during braking, often causing the brake fluid to boil. Regular brake fluid boils at about 350° F. and high-temperature brake fluid boils at from 400 to 500° F. However, brake fluid absorbs water, which lowers its boiling point. Over time, the boiling point of brake fluid containing water may drop to virtually the boiling point of water, e.g., to around 230° F. to 250° F. In situations where brake fluid boils, brake life is adversely affected, often resulting in damage to the brakes.

Attempts have been made to address the overheating of brake fluid. In one early design developed by the assignee of the present application, an extruded aluminum manifold was inserted between the pad and the piston of a brake caliper. Water was pumped through the manifold to directly cool the pad and piston. This system was manufactured only with considerable difficulty and expense because extruded aluminum had to be extrusion-bent, had welded end caps, yet still had to be watertight. It was also relatively heavy In another, later system manufactured by the assignee of the present application, the assignee took advantage of the good thermal conductivity of an aluminum brake caliper housing to cool the piston indirectly via conductive heat transfer with a liquid coolant, thereby negating the need to produce a complex manifold to supply coolant directly to the piston. In this system, an aluminum water cooled housing was mounted on the top of the main caliper housing. Several longitudinal cavities were formed in the top of the main caliper housing in fluid communication with first and second lateral cavities in the water cooled housing. Coolant inlets and outlets in the caliper housing opened axially into the first and second axially-offset lateral passages in the water cooled housing. The lateral passages in the water cooled housing were separated by baffles to promote water circulation through the longitudinal cavities in the main caliper housing. With this arrangement, water entering the inlet port of the water cooled housing flowed into the first lateral passage and was deflected through all three longitudinal cavities in the main caliper housing by baffles that separated the cavities from one another. The water then flowed into the second lateral passage in the water cooled housing and was directed back to the engine coolant system via the outlet opening.

The arrangement described above effectively cools the caliper housing but has several disadvantages. The baffled main caliper housing, though easier to manufacture than the earlier system described above, is still relatively complex and expensive to manufacture. It is also relatively heavy, undesirably contributing to a reduced acceleration-to-weight ratio in the vehicle serviced by the brake caliper. In addition, the convoluted now path of the fluid flow through the water cooled housing results in turbulent flow and considerably restricts fluid flow through the housing. More engine horsepower therefore is required to run the water pump at an effective rate than if the liquid flow were laminar and unrestricted.

Therefore, it would be desirable to provide a liquid cooled brake caliper that is less expensive and easier to manufacture than earlier known liquid cooled brake calipers. It would also be desirable to reduce the cost of manufacturing a liquid cooled brake caliper. It would also be desirable to reduce the weight of a liquid cooled brake caliper.

SUMMARY OF THE INVENTION

The invention, which is defined by the claims set out at the end of this disclosure, is intended to solve at least some of the problems noted above. The present invention provides a brake caliper that includes a cast metal housing, at least one piston slidably mounted in the bore, and a brake pad mounted on the piston. The housing has a bore formed therein and a coolant passage formed therethrough. The coolant passage is a single-pass passage having a coolant inlet and a coolant outlet. The coolant passage is fluidically isolated from the bore. The resultant caliper not only provides surprisingly effective conductive heat transfer from the hot brake fluid in the caliper, but is also easy to manufacture from a single casting and imposes much less flow restriction on coolant flowing therethrough than in prior systems.

A braking system for a vehicle is also provided. It includes a master cylinder, a source of liquid coolant, a rotatable disc, and a liquid cooled caliper having at least some of the characteristics described above. The cast metal housing of the liquid cooled caliper has a bore formed therein in fluid communication with the master cylinder. The coolant inlet and a coolant outlet of the coolant passage are connected to the source of liquid coolant.

A method of braking a vehicle is also provided. Brake fluid is admitted into a bore of a caliper housing to drive a pad on a piston into frictional contact with a rotating disc. Heat is generated as a result of the frictional contact. The brake fluid is cooled by directing a liquid coolant through a coolant passage in the caliper housing without changing directions of liquid flow within the caliper housing.

Features and advantages of the invention will become apparent to those skilled in the art upon review of the following drawings, the detailed description, and the appended claims.

BRIEF DESCRIPTION OF THE DRAWINGS

Preferred exemplary embodiments of the invention are illustrated in the accompanying drawings, in which like reference numerals represent like parts throughout and in which.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

1. Resume

Pursuant to the invention, a liquid cooled brake caliper is provided for a vehicular braking system. The braking system also includes a master cylinder, a source of liquid coolant, and a rotatable disc. The liquid cooled caliper includes a housing and a coolant passage formed through the housing. The coolant passage is a single-pass passage through which a liquid coolant passes to absorb heat from the caliper in order to prevent brake fluid in the caliper from boiling. The single pass coolant passage can be formed in a single casting with the caliper housing and imposes minimum restriction on coolant flowing therethrough, hence reducing the pumping load on the vehicle's coolant system.

2. Construction and Use of a Preferred Embodiment of a Liquid Cooled Caliper A liquid cooled caliper constructed in accordance with the invention can be used in a variety of vehicular braking systems. The invention is particularly well suited for use in a snowmobile braking system because snowmobile braking systems are particularly prone to brake fluid overheating because their brakes are operated at high speeds, high torques, and high duty cycles. At least high-performance snowmobiles are also very weight sensitive, requiring the lightest-possible components. They are also space sensitive, requiring that the brake caliper and other system components be as small as reasonably possible. The inventive brake caliper meets all of these needs.

Figure 1:
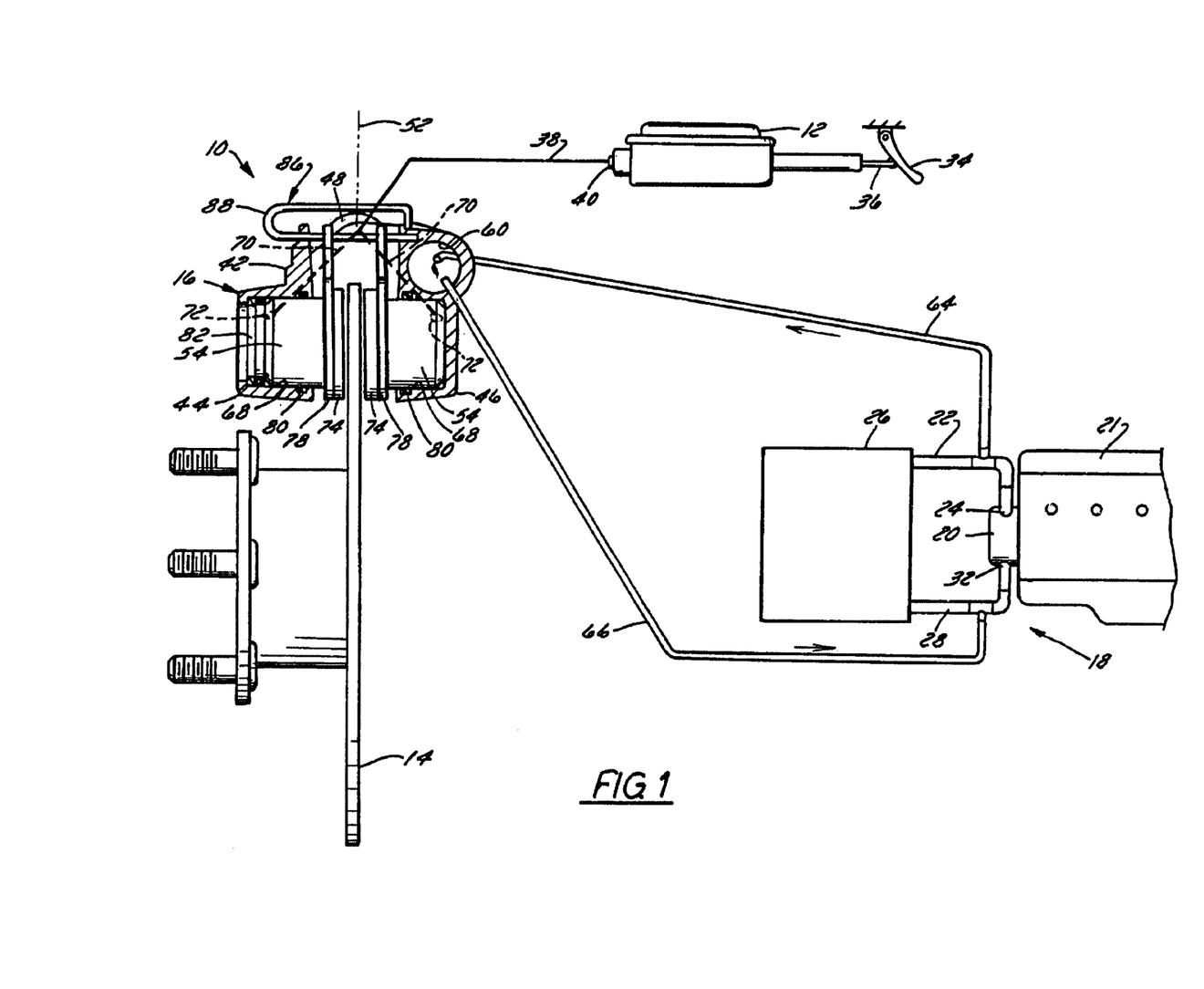
FIG. 1 is a schematic view of a brake system that includes a brake caliper constructed in accordance with a preferred embodiment of the invention, a master cylinder, a source of liquid coolant, and a rotary disc.

Referring now to FIG. 1, a snowmobile braking system 10 constructed in accordance with the invention includes a master cylinder 12, rotatable discs 14 (only one of which is shown), and brake calipers 16 (only one of which is shown), each of which is responsive to actuation of the master cylinder 12 to frictionally brake a respective disc 14. The calipers 16 are cooled by a liquid coolant supplied by the snowmobile's existing coolant system 18. The existing system 18 includes a pump 20 driven by the vehicle's engine 21. A main coolant supply line 22 couples the pump's outlet 24 to an inlet of a conventional heat exchanger 26, and a main coolant return line 28 couples an outlet of the heat exchanger 26 to the pump's inlet 32. The pump 20 continuously circulates a coolant, preferably a conventional ethylene glycol (antifreeze) solution, through the heat exchanger 26 via the main supply and return lines 22, 28. The caliper coolant system taps into the main supply and return lines 22, 28 as detailed below.

The master cylinder 12 may comprise any conventional master cylinder usable in a snowmobile braking system. The illustrated master cylinder 12 is actuated by a brake lever 34 coupled to the master cylinder 12 by a rod 36. Actuation of the lever 34 translates the rod 36 axially of the master cylinder 12 to cause pressurized fluid to flow into or out of the caliper 16 via a brake line 38 and an inlet/outlet port 40 in the master cylinder 12.

Figure 2:
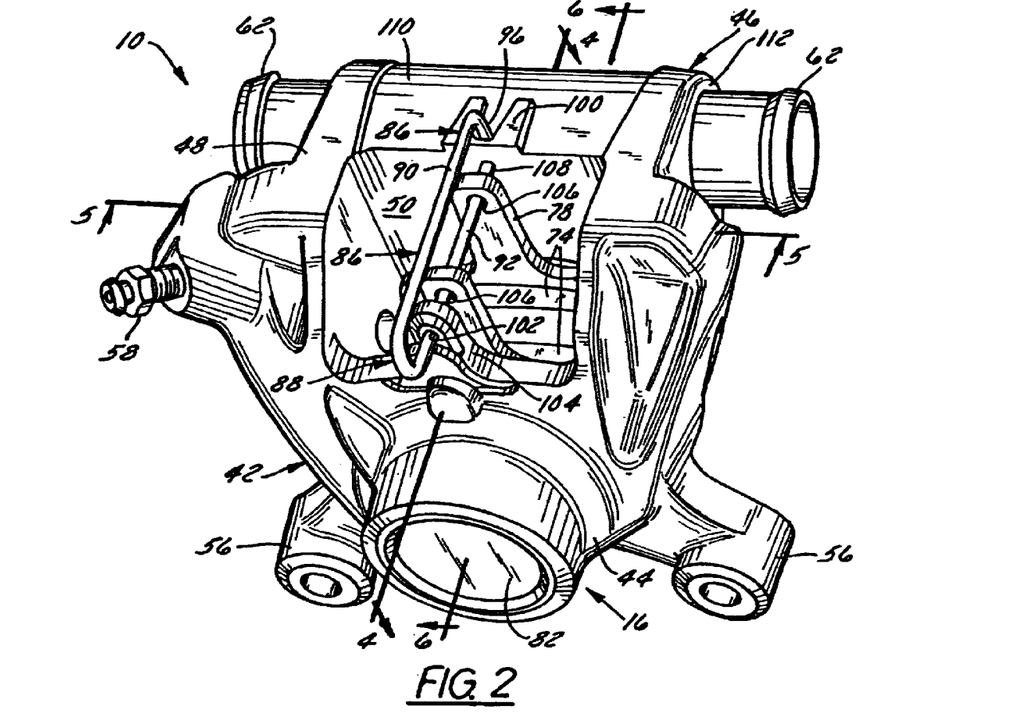
FIG. 2 is a perspective view of the brake caliper of FIG. 1, viewed from an inboard side of the brake caliper.
Figure 3:
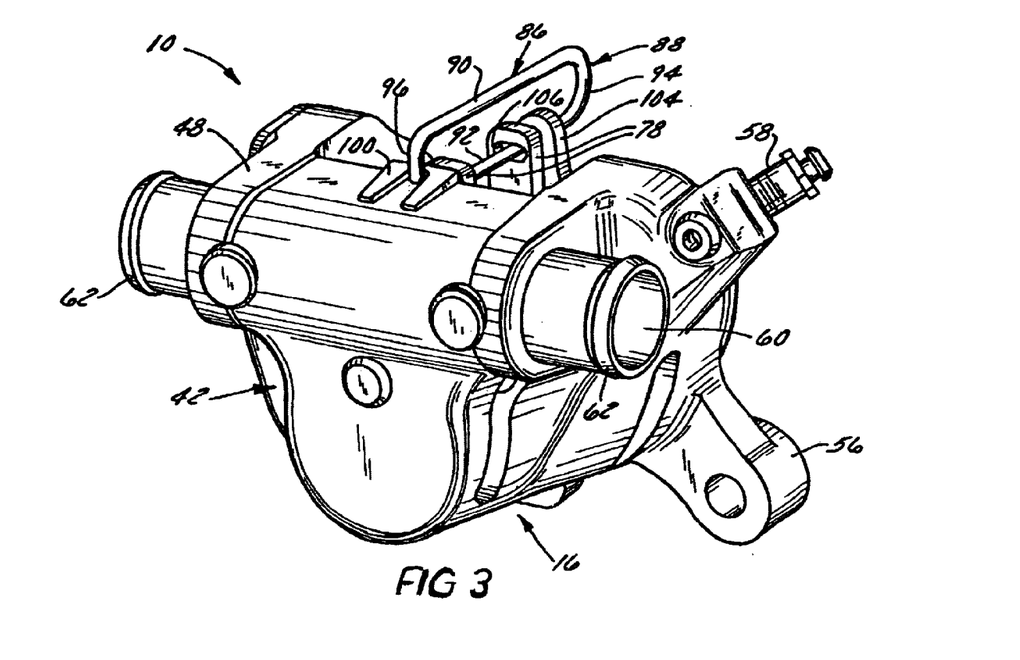
FIG. 3 is a perspective view of the brake caliper of FIGS. 1 and 2, viewed from the outboard side of the caliper.
Figure 7:
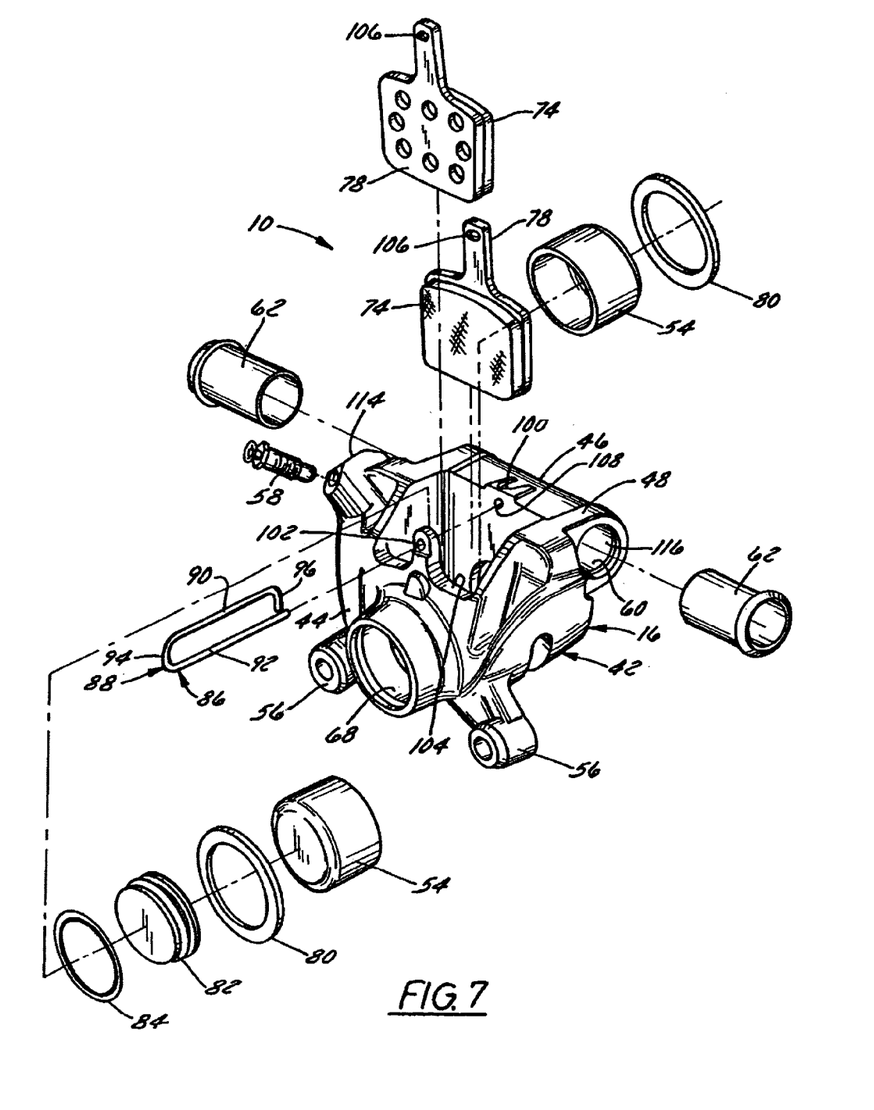
FIG. 7 is an exploded perspective view of the brake caliper.

Both calipers 16 of the typical snowmobile braking system are identical. Only the illustrated caliper 16 will be described, it being understood that the other caliper 16 will be a mirror image of the illustrated caliper. Still referring to FIG. 1, the illustrated liquid cooled caliper 16 includes a housing 42 having inboard and outboard sections 44, 46 connected to one another by a bridge portion 48. The bridge portion 48 spans an opening 50 that has a longitudinal centerline 52 containing the disc 14. The illustrated housing 42 is a fixed mount, dual piston housing supporting a pair of axially-movable pistons 54, one of which is mounted in each of the sections 44 and 46. The housing 42 is mounted on a support (not shown) at ear mounts 56 (FIGS. 2–4 and 7) located on the inboard section 44 of the housing 42. A bleed port 58 is disposed on the inboard section 44 of the housing 42 for bleeding the brake fluid. A single-pass coolant passage 60 is formed through the outboard side 44 of the housing 42 and extends perpendicularly to the axis of the disc 14, i.e., in parallel with the longitudinal centerline 52 of the opening 50. As shown in FIGS. 2—3 and 7, fittings 62 can be inserted into the ends of the passage 60. Fittings 62 are configured for connection to coolant supply and return conduits 64, 66 that tap into the respective main supply and return lines 22, 28 of the engine coolant system 18 as best seen in FIG. 1.

The housing 42 is a cast metal housing, preferably made from cast aluminum. Cast aluminum is preferred because it is lightweight, can be cast with complex internal and external features, and has high thermal conductivity. The high thermal conductivity promotes efficient conductive heat transfer from operative components of the caliper 16 (namely, the ,brake pads 14; pistons 54, and the brake fluid) to coolant in the coolant passage 60 as detailed below. Preferably, the entire housing 42, including both sections 44, 46, the bridge portion 48, the coolant passage 60, and the ear mounts 56, is a one-piece, cast body. A one-piece body is easier and less expensive to manufacture than a multiple-piece body. For example, a one-piece caliper eliminates machining requirements that are necessary when manufacturing multiple-piece calipers. Hence, bores, passages, housing ends, and other features can be formed directly during the casting process as opposed to having to be machined into the housing or formed on or in a multi-component housing. A one-piece aluminum housing is also very lightweight. The illustrated housing 42, being designed for a high-performance snowmobile, weighs less than 3.5 lbs. and, more preferably, less than 3.0 lbs., as compared with about 4.5 lbs. for a baffled-type water cooled caliper described in the Background section above. The weight reduction results in an increased acceleration-to-weight ratio—an important benefit in high-performance snowmobiles. The housing 42 could, alternatively, be a multiple-piece cast aluminum or steel body, the parts of which are bolted or otherwise connected together.

Figure 6:
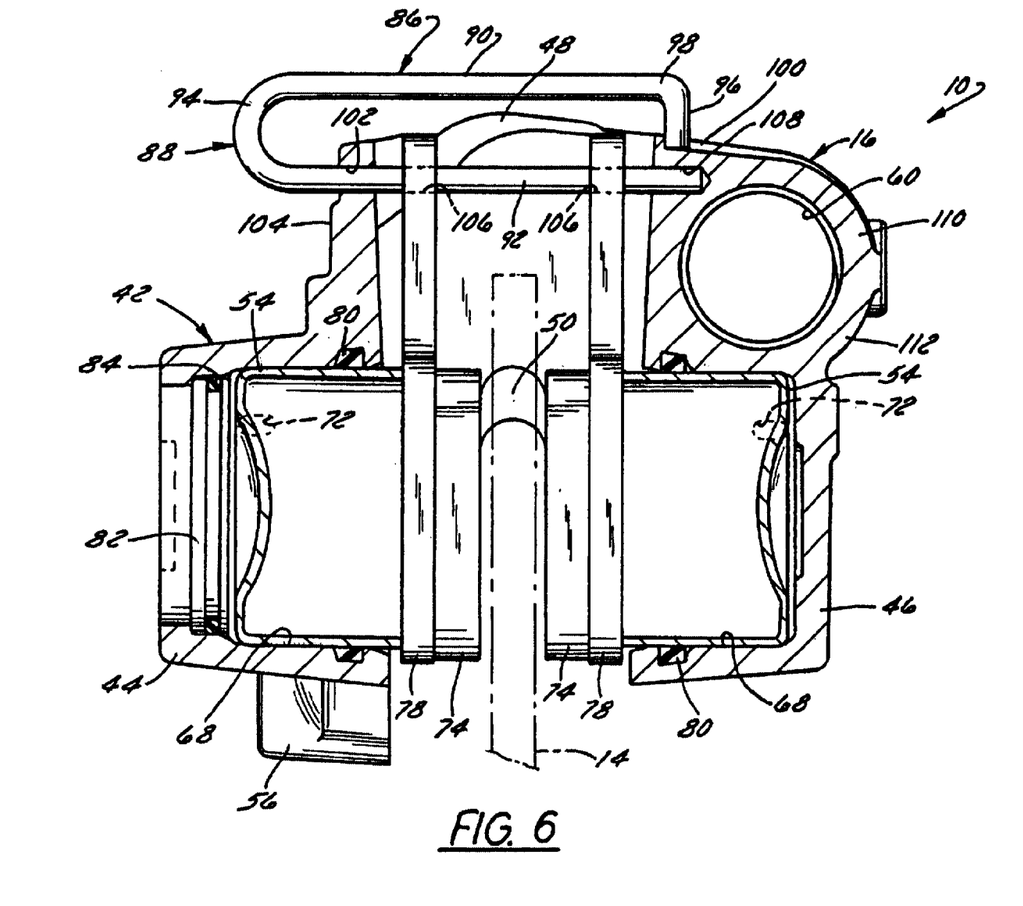
FIG. 6 is a cross-sectional view of the brake caliper taken generally along line 6—6 and showing a radial cross-section of a coolant passage in the caliper housing.

As is best shown in FIG. 6, each housing section 44, 46 has a bore 68 formed therein in parallel with the disc axis. Each bore 68 is fluidically isolated from the coolant passage 60 and is in fluid communication with the master cylinder 12 via a respective internal brake fluid passage 70 connected to the brake line 38 and opening into an orifice 72 formed in the inner portion of the bore 68. A piston 54 is slidably mounted in each bore 68 in front of the associated orifice 72. A brake pad 74 is mounted on each piston 54 via a mounting plate 78. Each brake pad 74 is configured to selectively engage with and disengage from the brake disc 14 upon extension and retraction of the associated piston 54 in response to the flow of pressurized fluid into or out of the associated bore 68. Referring to FIG. 7, each piston 54 is sealing guided in its respective bore 68 by a square seal 80. The end of the outboard bore 68 is cast integrally with the housing 42. The end of the bore 68 in the inboard section 44 is formed from a bore plug 82 that is sealed to the casting by a seal 84.

As can best be seen in FIGS. 2, 3, and 6, in a preferred embodiment, the mounting plates 78 are guided for movement relative to the housing 42 by a retainer pin 86, which includes a generally U-shaped portion 88 having first and second legs 90, 92 connected to one another by a bent section 94. A hook portion 96 extends perpendicularly from a free end 98 of the first leg 90 and into a notched lug 100 on top of the outboard housing section 46. The second leg 92 of the retainer pin 86 is inserted through a hole 102 in an upper portion 104 of the inboard section 44 of the housing 42, through holes 106 in the mounting plates 78, and into a hole 108 disposed below the lug 100 on the outboard section 46 of the housing 42. When the retainer pin 86 is assembled as illustrated, it prevents the mounting plates 78 from relative movement other than linear movement along the second leg 92.

Figure 4:
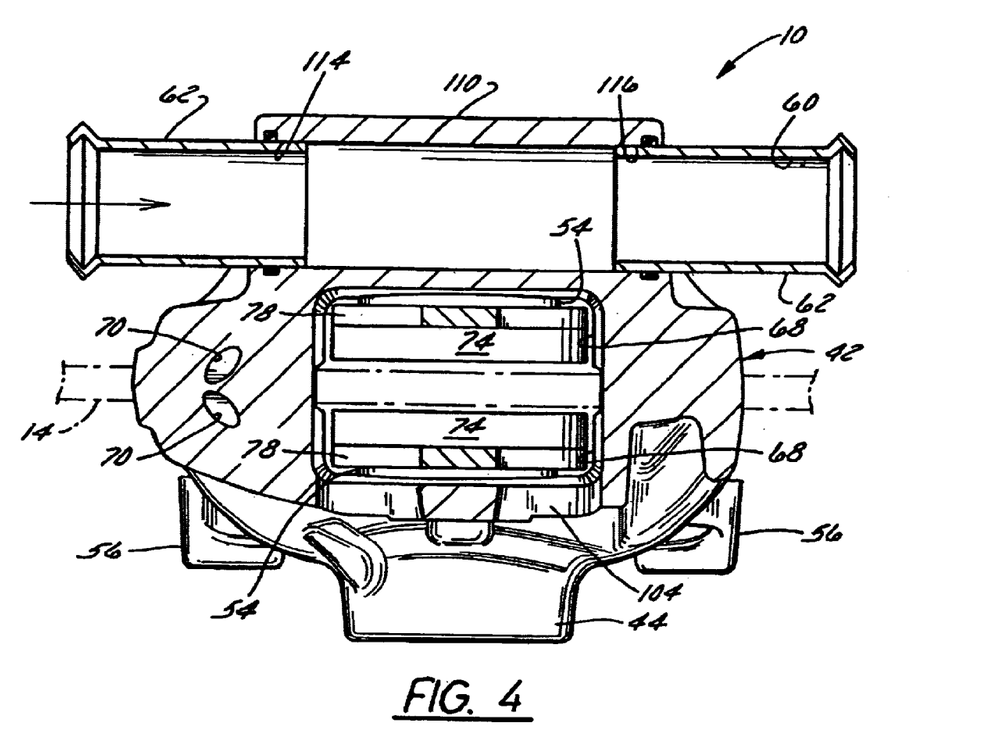
FIG. 4 is a cross-sectional view of the brake caliper taken generally along line 4—4 and showing an axial cross-section of a coolant passage in the a caliper housing of the caliper.
Figure 5:
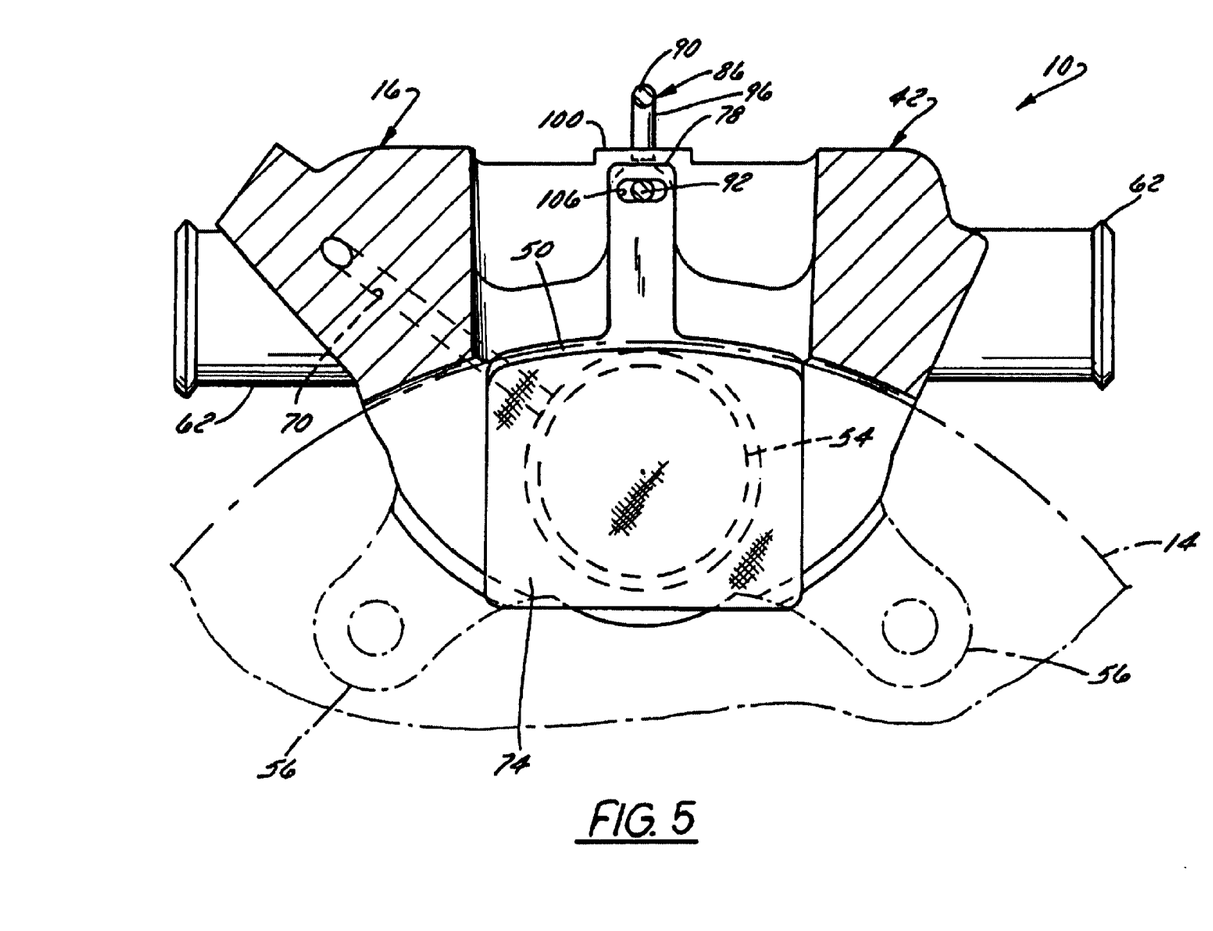
FIG. 5 is a cross-sectional view of the brake caliper taken generally along line 5—5 and showing a radial cross-section through a piston of the caliper.

Referring to FIGS. 1, 4, and 6, the coolant passage 60 is located on the outboard side 46 of the housing 42 directly above the bore 68. The coolant passage 60 is a single-pass, cylindrical passage extending completely through a protrusion 110 on an upper portion 112 of the outboard housing section 46 to form an axially aligned inlet and outlet 114, 116 that receive the fittings 62. Its axis extends at least generally parallel with the longitudinal centerline 52 of the opening 50 and perpendicular to the axis of the disc 14. The coolant passage inlet and outlet 114, 116 are in fluid communication with the coolant supply and return conduits 64, 66, respectively (FIG. 1). The coolant passage 60 is of an essentially constant diameter along essentially an entire length of the passage 60. Preferably, the coolant passage 60 has a diameter of at least 0.5" to 1.25", and more preferably a diameter of about 1.0". Due to the fact that the passage 60 1) is single pass, 2) is of relatively large diameter, and, 3) lacks baffles or other protrusions within it, coolant flows laminarly through the passage 60 with minimal heat losses. Less engine horsepower therefore is required to run the pump 20 than would be required to pump coolant through the more convoluted flow paths of prior known caliper coolant passages. A relatively small coolant pump 20 therefore can be used to pump coolant through both the engine coolant and caliper coolant systems without fear of overheating either the engine or the brake fluid, thereby further reducing the overall size and weight of the machine. A given volume of fluid is also in the relatively short passage 60 for only a brief period and, therefore, experiences less temperature change than the same volume flowing through the baffled housing described in the Background section above.

In use, upon master cylinder actuation, a brake fluid is admitted into the bores 68 of the caliper housing sections 44, 46 to drive the respective pistons 54 into positions in which the pads 74 frictionally engage opposite sides of the rotating disc 14. Heat is generated as a result of this frictional contact. The brake fluid is cooled by directing a liquid coolant through the supply conduit 64 from the main supply line 22, through the coolant passage 60 in the caliper housing 42 without changing the direction of liquid flowing in the caliper housing 42, and back to the main return line 28 via the return conduit 66. More specifically, heat in the brake fluid, brake pad 74, and mounting plate 78 is transferred by conductive heat transfer through the caliper 16 to the coolant in the coolant passage 60. Despite the fact that the surface area of the single-pass coolant passage 60 is less than the surface area of the baffle passage described above, efficient cooling takes place in the single-pass coolant passage. For example, using the baffled caliper described in the Background section above, the brake fluid is cooled to about 220° F. with a coolant temperature at 200° F. and a coolant flow rate of 20 gpm. With the shingle-pass caliper 16 described herein, brake fluid is cooled to about 230 to 235° F. by a coolant at the same initial temperature of 200° F. and the same coolant flow rate of 20 gpm.

Hence, the liquid cooled brake caliper 16 is efficiently cooled. It can therefore be worked harder than a non-cooled or a previously-designed cooled caliper, such as this baffled caliper described in the Background section. Therefore, the size of the caliper 16 can be downsized for a particular application. This results in further weight reduction and further cost reduction. Because weight is such a major concern in high performance snowmobiles, the overall weight reduction provided by this embodiment of the invention is currently worth $8.00 on a high performance snowmobile. Furthermore, liquid cooling can also be used in other calipers, and/or in other applications that previously have not used a liquid cooled caliper, such as a single piston, flexible disc, fixed mount caliper or single piston, sliding mount caliper. Moreover, in addition to the cooling efficiency and weight benefits discussed above, the liquid cooled caliper 16 is much less expensive to manufacture than prior known liquid cooled calipers.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A brake caliper comprising:
   (A) a cast metal housing having
      (1) a bore formed therein,
      (2) a coolant passage formed therethrough, said coolant passage being (a) a single-pass passage that extends at least generally linearly from an inlet on one side of said housing to an outlet on an opposite side of said housing and (b) fluidically isolated from said bore;
   (B) at least one piston slidably mounted in said bore; and
   (C) a brake pad mounted on said piston.

2. The brake caliper as recited in claim 1, wherein said housing is made from cast aluminum.

3. The brake caliper as recited in claim 2, wherein the entire housing comprises a one-piece, cast aluminum body.

4. The brake caliper as recited in claim 1, wherein said coolant passage comprises a cylindrical coolant bore extending completely through said housing.

5. The brake caliper as recited in claim 4, wherein said coolant bore is of an essentially constant diameter along essentially an entire length thereof.

6. The brake caliper as recited in claim 5, wherein said coolant bore has a diameter of at least 0.5".

7. The brake caliper as recited in claim 6, wherein said coolant bore has a diameter of about 1.0".

8. The brake caliper as recited in claim 1, wherein said housing has an outboard side housing a first piston in a first transversely-extending bore thereof, an inboard side housing a second piston in a second transversely-extending bore thereof, mounting members formed thereon for mounting said housing on a support, and a longitudinally extending opening disposed between said pistons and configured to receive a disc.

9. The brake caliper as recited in claim 8, wherein said coolant passage comprises a longitudinally extending cylindrical coolant bore formed completely through said outboard side of said housing.

10. A brake caliper comprising:
(A) a cast metal housing having
(1) a bore formed therein,
(2) a coolant passage formed therethrough, said coolant passage being (a) a single-pass passage having a coolant inlet and a coolant outlet "on opposite sides of said housing" and (b) fluidically isolated from said bore;
(B) at least one piston slidably mounted in said bore; and
(C) a brake pad mounted on said piston,
wherein said housing has an outboard side housing a first piston in a first transversely-extending bore thereof, an inboard side housing a second piston in a second transversely-extending bore thereof, mounting members formed thereon for mounting said housing on a support, and a longitudinally extending opening disposed between said pistons and configured to receive a disc, and
wherein said caliper is configured for use in a snowmobile braking system and weighs less than 3.5 lbs.

11. The brake caliper as recited in claim 10, wherein said caliper weighs less than 3.0 lbs.

12. A brake caliper comprising:
(A) a cast metal housing having
(1) an opening configured to receive a disc and having a longitudinal centerline.
(2) a bore formed therein and extending perpendicularly to said longitudinal centerline,
(3) a cylindrical coolant passage formed completely therethrough and having an axis extending at least generally parallel with said longitudinal centerline, said coolant passage (a) having a coolant inlet and a coolant outlet that are collinear with said axis and (b) being fluidically isolated from said bore;
(B) at least one piston slidably mounted in said bore and configured to extend and retract perpendicularly to the axis of said coolant passage; and
(C) a brake pad mounted on said piston.

13. The brake caliper as recited in claim 12, wherein the entire housing comprises a one-piece, cast aluminum body.

14. A disc brake caliper comprising:
(A) an aluminum housing formed from a single casting and having
(1) an opening configured to receive a disc and having a longitudinal centerline,
(2) a first bore formed therein on an outboard side of said longitudinal centerline and extending perpendicularly to said longitudinal centerline,
(3) a second bore formed therein on an inboard side of said longitudinal centerline and extending perpendicularly to said longitudinal centerline,
(4) mounting members, formed on said inboard side of said longitudinal centerline, for mounting said housing on a support, and
(5) a cylindrical coolant passage formed completely therethrough on said outboard side of said longitudinal centerline and having an axis extending at least essentially parallel with said longitudinal centerline, said coolant passage (a) having a coolant inlet and a coolant outlet that are collinear with said axis; (b) being fluidically isolated from said first and second bores, and (c) having a diameter of at least 0.75";
(B) first and second pistons slidably mounted in said first and second bores; and
(C) first and second brake pads mounted on said first and second pistons.

15. The disc brake caliper as recited in claim 14, wherein said caliper is configured for use in a snowmobile braking system and weighs less than 3.0 lbs.

16. A braking system for a vehicle, comprising:
(A) a master cylinder;
(B) a source of liquid coolant;
(C) a rotatable disc; and
(D) a liquid cooled caliper comprising
(1) a cast metal housing having
(a) a bore formed therein in fluid communication with said master cylinder,
(b) a coolant passage formed therethrough, said coolant passage being (i) a single-pass passage that extends at least generally linearly from an inlet on one side of said housing to an outlet on an opposite side of said housing, wherein said coolant inlet and said coolant outlet are both connected to said source of liquid coolant, and (ii) fluidically isolated from said bore;
(2) at least one piston slidably mounted in said bore; and
(3) a brake pad mounted on said piston and configured to selectively engage with and disengage from said disc upon extension and retraction of said piston.

17. The braking system as recited in claim 16, wherein said source of liquid coolant comprises a coolant pump coupled to a radiator of the vehicle.

18. A snowmobile braking system, comprising:
(A) a master cylinder;
(B) a coolant pump having an inlet and an outlet;
(C) a rotatable disc; and
(D) a brake caliper including
(1) an aluminum housing formed from a single casting and having
(a) an opening that receives said disc and that has a longitudinal centerline,
(b) a first bore formed therein on an outboard side of said longitudinal centerline, extending perpendicularly to said longitudinal center-line, and being in fluid communication with said master cylinder,
(c) a second bore formed therein on an inboard side of said longitudinal center-line and extending perpendicularly to said longitudinal centerline, and being in fluid communication with said master cylinder,
(d) mounting members formed on said inboard side of said longitudinal centerline for mounting said housing on a support, and
(e) a cylindrical coolant passage formed completely therethrough on said outboard side of said longitudinal centerline and having an axis extending at least essentially parallel with said longitudinal centerline, said coolant passage (a) having a coolant inlet and a coolant outlet that are collinear with said axis and that are in fluid communication with the fluid outlet and the fluid inlet of said pump, respectively, (b) being fluidically isolated from said first and second bores, and (c) having a diameter of at least 0.75", wherein said housing weighs less than 3.0 lbs, (2) first and second pistons slidably mounted in said first and second bores, and (3) first and second brake pads mounted on said first and second pistons and configured to selectively engage with and disengage from said disc upon extension and retraction of said first and second pistons.

19. A method of braking a vehicle comprising:

(A) admitting brake fluid into a bore of a caliper housing to drive a pad on a piston into frictional contact with a rotating disc;

(B) generating heat as a result of the frictional contact; and (C) cooling said brake fluid by directing a liquid coolant through a coolant passage in said caliper housing without changing directions of liquid flow within said caliper housing.

20. The method as recited in claim 19, wherein said coolant passage comprises a cylindrical bore extending completely through said housing, and wherein said cooling step comprises directing said coolant through said bore.

21. The method as recited in claim 19, wherein the cooling step comprising cooling brake fluid comprises reducing the temperature of said brake fluid by at least 50° F.

22. The method as recited in claim 21, wherein the cooling step comprising cooling brake fluid comprises reducing the temperature of said brake fluid by 100° F.

23. A method of claim 19, wherein said liquid coolant is directed through said coolant passage in said caliper housing such that said liquid coolant flows through said caliper housing from an inlet on one side of said housing to an outlet on an opposite side of said housing without changing directions of liquid flow within said caliper housing.

24. A method of braking a vehicle comprising:

(A) admitting brake fluid into a bore of a caliper housing to drive a pad on a piston into frictional contact with a rotating disc;

(B) generating heat as a result of the frictional contact; and (C) cooling said brake fluid by directing a liquid coolant through a coolant passage in said caliper housing without changing directions of liquid flow within said caliper housing, wherein said cooing step comprises pumping engine coolant through said coolant passage at a rate of no more than 20 gpm.

25. The method as recited in claim 24, wherein said cooing step comprises pumping engine coolant through said coolant passage at a rate of 10–15 gpm.

* * * * *